United States Patent
Kobres et al.

(10) Patent No.: US 9,967,270 B2
(45) Date of Patent: *May 8, 2018

(54) ENTERPRISE INTRUSION DETECTION AND REMEDIATION

(71) Applicant: NCR Corporation, Duluth, GA (US)

(72) Inventors: Erick Kobres, Lawrenceville, GA (US); Stavros Antonakakis, Lake Mary, FL (US)

(73) Assignee: NCR Corporation, Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/419,012

(22) Filed: Jan. 30, 2017

(65) Prior Publication Data
US 2017/0142142 A1 May 18, 2017

Related U.S. Application Data

(63) Continuation of application No. 14/530,133, filed on Oct. 31, 2014, now Pat. No. 9,584,532.

(51) Int. Cl.
| | | |
|---|---|---|
| H04L 29/00 | (2006.01) | |
| H04L 29/06 | (2006.01) | |
| G06F 21/50 | (2013.01) | |
| G06F 21/55 | (2013.01) | |

(52) U.S. Cl.
CPC .......... *H04L 63/1416* (2013.01); *G06F 21/50* (2013.01); *G06F 21/554* (2013.01); *G06F 21/55* (2013.01)

(58) Field of Classification Search
None
See application file for complete search history.

(56) References Cited

U.S. PATENT DOCUMENTS

| | | | | |
|---|---|---|---|---|
| 9,282,115 | B1 * | 3/2016 | Kaushik | H04L 63/1441 |
| 2011/0055925 | A1 * | 3/2011 | Jakobsson | G06F 21/552 |
| | | | | 726/25 |
| 2012/0254982 | A1 * | 10/2012 | Sallam | G06F 21/566 |
| | | | | 726/16 |
| 2012/0255021 | A1 * | 10/2012 | Sallam | G06F 21/564 |
| | | | | 726/25 |
| 2014/0188732 | A1 * | 7/2014 | Kobres | H04L 63/0442 |
| | | | | 705/64 |

* cited by examiner

*Primary Examiner* — Madhuri Herzog
(74) *Attorney, Agent, or Firm* — Schwegman, Lundberg & Woessner

(57) ABSTRACT

Events are securely packaged and transmitted from peripherals of terminals and from secure input/out modules (SIOMs) of terminals. The events are collected and mined in real time for security risk patterns and dynamic remedial actions are pushed back down to the terminals, peripherals, and SIOMs.

16 Claims, 5 Drawing Sheets

ENTERPRISE INTRUSION DETECTION AND REMEDIATION

This Application claims the benefit of and is a continuation of U.S. Ser. No. 14/530,133, entitled "Enterprise Intrusion Detection and Remediation," filed on Oct. 31, 2014, now issued as U.S. Pat. No. 9,584,532; the disclosure of which is incorporated by reference herein in its entirety.

BACKGROUND

Online or electronic security is a major issue in the industry. It seems a month does not go by without news of some major business having a security breach. Such breaches include government agencies, retail outlets, social media companies, and even major banks.

Whenever an enterprise believes that a secure fix to remedy a breach has been deployed, hackers quickly figure out a new way to breach their systems. In some cases, the breaches are not even within the systems of the enterprise; rather, the breaches can occur over network transmission lines that enter or exit the enterprise systems; the hackers use sniffing techniques to acquire copies of data packets being transmitted over the network lines and find a way to break any encryption being used (assuming encryption was being used).

The problem of security is particularly problematic with financial transactions where a consumers identity information, banking, and credit card details are at risk of being compromised.

For example, a Point-Of-Sale (POS) terminal or an Automated Teller Machine (ATM) includes a variety of independent internal peripheral devices that interact with a main processing unit, such as a printer, an encrypted pin pad, a scanner, a touch screen, a magnetic card reader, and the like. Each of these may be integrated within the main processing unit through a variety of connections, such as through Universal Serial Bus (USB) connections, and others. Each of these peripheral devices have processing capabilities and have the ability to be compromised and once compromised each peripheral can compromise other peripherals, the main processing unit, or even infiltrate the network and spread to other POS terminals, other ATMs, or backend servers.

Enterprises have spent and continue to spend large sums of capital resources and human resources to improve security of their systems and all the devices and connections of those devices to their systems. This is an ongoing process always trying to stay one step ahead of hackers and yet it seems enterprises are always one step behind the hackers.

Therefore, there is a need for a more proactive, adaptable, and dynamical remedial approach to improving security of enterprise systems.

SUMMARY

In various embodiments, techniques for providing automated intrusion detection and remediation are presented. According to an embodiment, a method for providing automated intrusion detection and remediation is provided.

Specifically, an event is received, the event is securely communicated from a component of a terminal over a network. Heuristics are accessed to identify a pattern for the event. An action is automatically triggered based on the pattern that is securely pushed through the network to the component for processing the action.

DETAILED DESCRIPTION

Figure 1A:
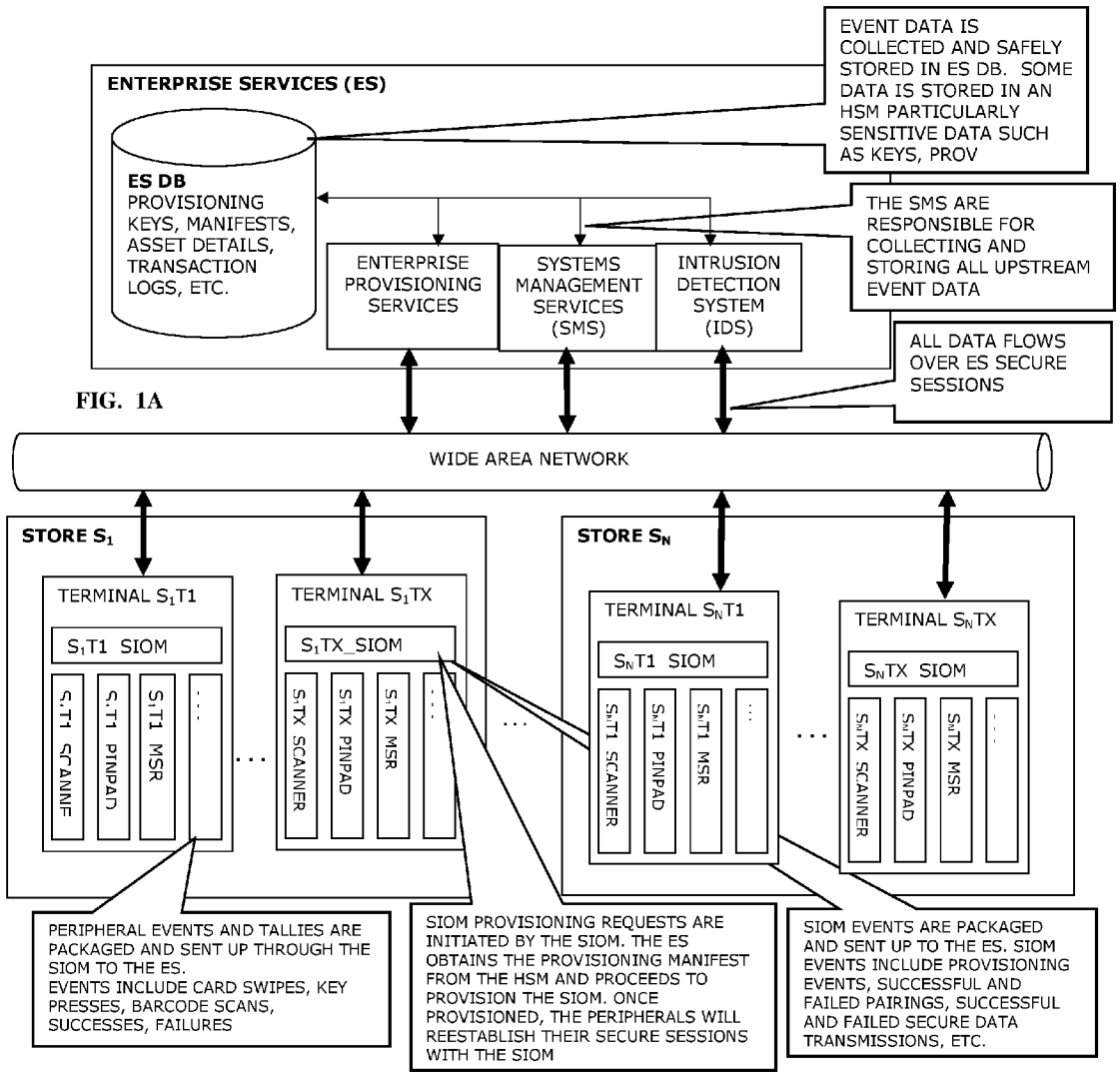
FIG. 1A is a diagram of an enterprise system for automated intrusion detection and remediation, according to an example embodiment.

FIG. 1A is a diagram of an enterprise system for automated intrusion detection and remediation, according to an example embodiment. The components of the enterprise system are shown in greatly simplified form with only those components shown necessary for the understanding of the various embodiments of the invention.

The enterprise system includes an enterprise service database, enterprise provisioning services, system management services, an Intrusion Detection System (IDS), a network and a plurality of retail stores. Each retail store includes a plurality of Point-Of-Sale (POS) terminals (may also be kiosks or Automated Teller Machines (ATMs) or combinations thereof).

Each terminal includes a Secure Input/Output Module (SIOM), which is a hardware module that operates independent of the Operating System (OS) of the terminal. Each SIOM controls message passing to and from the independent peripheral devices of its terminal. Some example peripheral devices are illustrated in the FIG. 1 as scanners, pin pads, magnetic strip/card readers. It is noted that other peripherals may exists as well such as touch screen, printer, currency dispenser, and the like.

The enterprise database houses provisioning keys (for encryption, decryption, authentication, and the like), manifests (security rules, security policies, encryption algorithms/techniques, certificates, keys, security permissions, security roles, etc.), asset details (identifiers for devices, capabilities of devices, software resources, versioning information, etc.), transactions logs (for each retail store, for each terminal within a store, and for each peripheral device within each terminal), and other desired enterprise information desired to be collected and housed in the enterprise database.

The enterprise provisioning services are responsible for securely provisioning each SIOM of each terminal with a manifest from the enterprise database. This is achieved over the network using a secure encryption protocol. The manifest details how the SIOM is to securely communicate with and monitor security for each of the peripheral devices that it services. For example, one encryption algorithm and set of keys for data payload passing to and from a particular scanner may use a completely different encryption algorithm and set of keys for data payload passing to and from a particular pin pad.

The SIOMs requests or may receive unsolicited initial provisions. The enterprise provisioning system obtains the provisioning manifest unique to the requesting SIOM from a hardware security module (or similar secure repository) associated with the enterprise database and proceeds to provision the requesting SIOM. Once provisioned, the peripherals re-establish their secure sessions with the requesting SIOM.

The SIOM also collects events that are packaged and sent up to the enterprise system management services. SIOM events include provisioning events, successful and failed pairings with peripherals, successful and failed secure data transmissions, etc.

The systems management services are responsible for collecting and storing all upstream data received in a secure encrypted format from each of the SIOMs through the terminals. All data passed in the enterprise system occurs via a secure session (encryption techniques defined in the manifests).

Each peripheral device captures events and tallies that are packaged by that peripheral and sent up through the SIOM and onto the system management services.

Events from the peripherals and the SIOMs are dynamically and in real rime evaluated by the IDS.

Figure 1B:
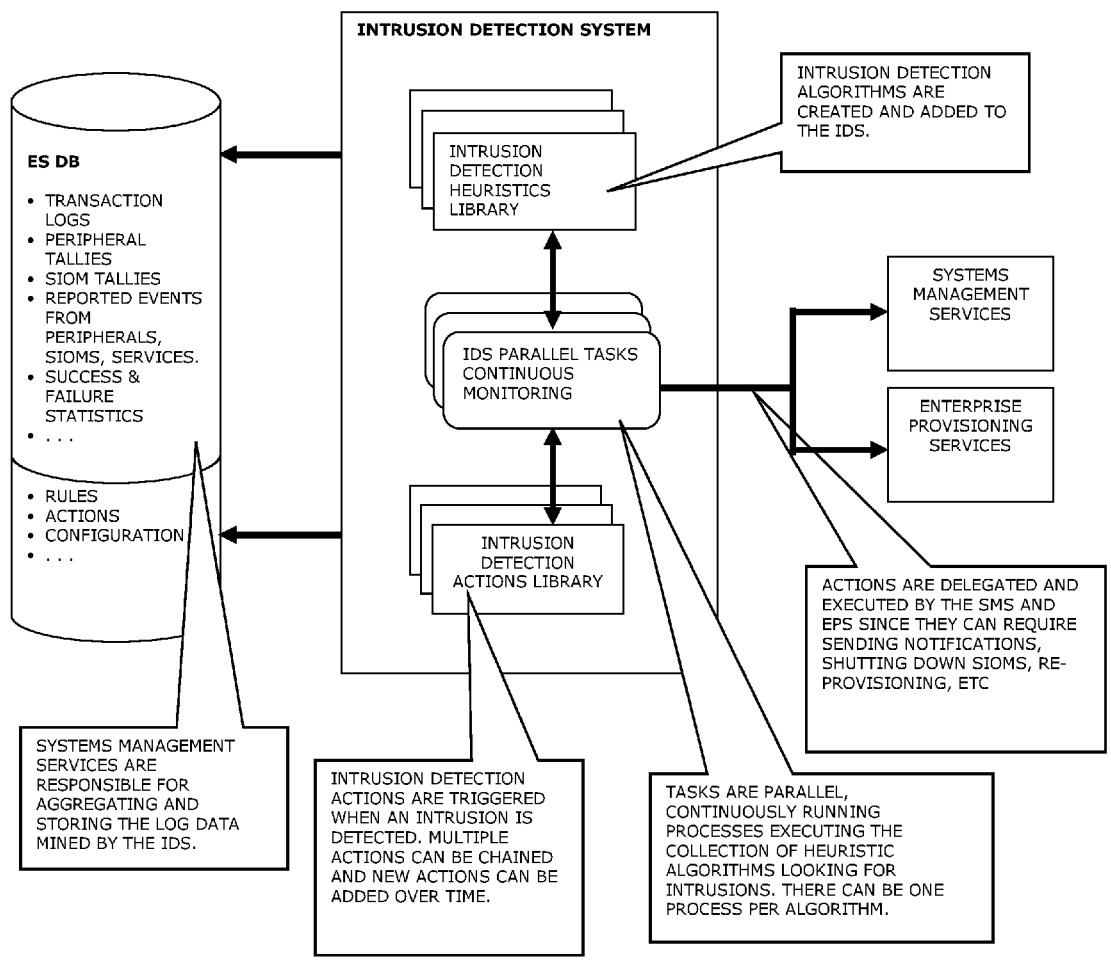
FIG. 1B is a diagram of interactions for the Intrusion Detection System (IDS) of the enterprise system illustrated in the FIG. 1A, according to an example embodiment.

FIG. 1B is a diagram of interactions for the Intrusion Detection System (IDS) of the enterprise system illustrated in the FIG. 1A, according to an example embodiment.

The IDS includes an intrusion detection heuristics library, an IDS parallel tasks continuous monitoring module, and an IDS actions library.

Intrusion detection algorithms are continuously created and added dynamically to the intrusion detection heuristics library.

Tasks of the IDS parallel tasks continuous monitoring module are parallel and continuously running processes executing the collection of heuristic algorithms looking for intrusions. In an embodiment, there can be one process per algorithm.

Intrusion detection actions of the intrusion detection actions library are automatically and dynamically triggered in real time when an intrusion is detected. Multiple actions can be chained and new actions can be dynamically added in real time as needed.

The systems management services aggregate and store log data mined by the IDS.

The actions from the actions library are delegated and executed by the systems management services and the enterprise provisioning services since these services can dynamically send notifications securely down through the network, shut down SIOMs, require re-provisioning, etc.

The IDS includes a pool of tasks that run continuously monitoring for an assortment of intrusions. When an intrusion is detected, the IDS triggers associated actions, which include notifications and counter measures to prevent or stop the attack. The IDS tasks load the intrusion detection heuristics algorithms. Intrusion detection algorithms can be incrementally and dynamically added or retired.

The IDS leverages the enterprise database for mining the events occurring in the enterprise system (ecosystem being monitored for security risks). The telemetry flows upstream from the secure peripherals, to SIOMs, to the enterprise services where the system management services aggregate and persist it in the enterprise database.

The IDS heuristics algorithms analyze various types of data over different timeframes looking for intrusion patterns. Moreover, actions libraries can be incrementally added to the systems and configured (or linked) to a particular intrusion algorithm. If the IDS detects and intrusion, the associated chain of actions is executed.

It is also noted that the IDS's actions, heuristics, and tasks are configurable, with the configuration details persisted in the enterprise database.

The patterns that the heuristics algorithms can recognize are configurable. Deployment follows a hierarchical pattern: enterprise services—SIOMs—secure services—secure peripherals.

Some example intrusion detection patterns from the telemetry (having the events) are listed below along with the variability in what can be configured into the IDS, such example patterns may include, but are not limited to:

A terminal's MSR's secure session fails and must be re-paired often.

The SIOM receives out-of-order secure session messages frequently from a peripheral.

A secure peripheral receives out-of-order secure session messages frequently from the SIOM.

A SIOM occasionally fails to pair with its secure peripherals.

A SIOM receives a secure session message for a session that's no longer active

A mismatch exists between a SIOM pairing requests issued by the EPS and the provisioning tallies on a SIOM.

Duplicate secure peripheral ID (UDID (unique device identifier) exists in the ecosystem.

A secure peripheral ID was detected that was not accounted for in the device inventory.

Duplicate SIOM IDs exist in the ecosystem.

A SIOM frequently fails provisioning.

An endpoint fails to create a secure session message after the secure session was established.

An endpoint fails to decode & decrypt a secure session message.

An endpoint changes the secure profile used for communication during a secure session.

A revoked or decommissioned secure peripheral or SIOM is detected in the ecosystem.

A SIOM fails and must re-pair with its endpoints on a fairly regular interval.

A secure session failure occurs requiring a re-pairing with the SIOM on a fairly regular interval. E.g., every day around 3 p.m.

Traditional intrusion detection systems are network or host centric focusing on packets of data that flow either through the network or into and out of a host system. The novel IDS presented has a wider reach than traditional approaches by collecting security and operational event information that occurs on peripherals and SIOMs in the ecosystem as well as looking at network and terminal host information. Furthermore, because the event reporting occurs within secure sessions (via control messages), endpoint authenticity, event integrity and availability are preserved making it very difficult for an attacker to prevent the transmission or alter telemetry data in an attempt to spoof or misinform the system.

The above-discussed embodiments and other embodiments are now discussed with reference to the FIGS. 2-4.

Figure 2:
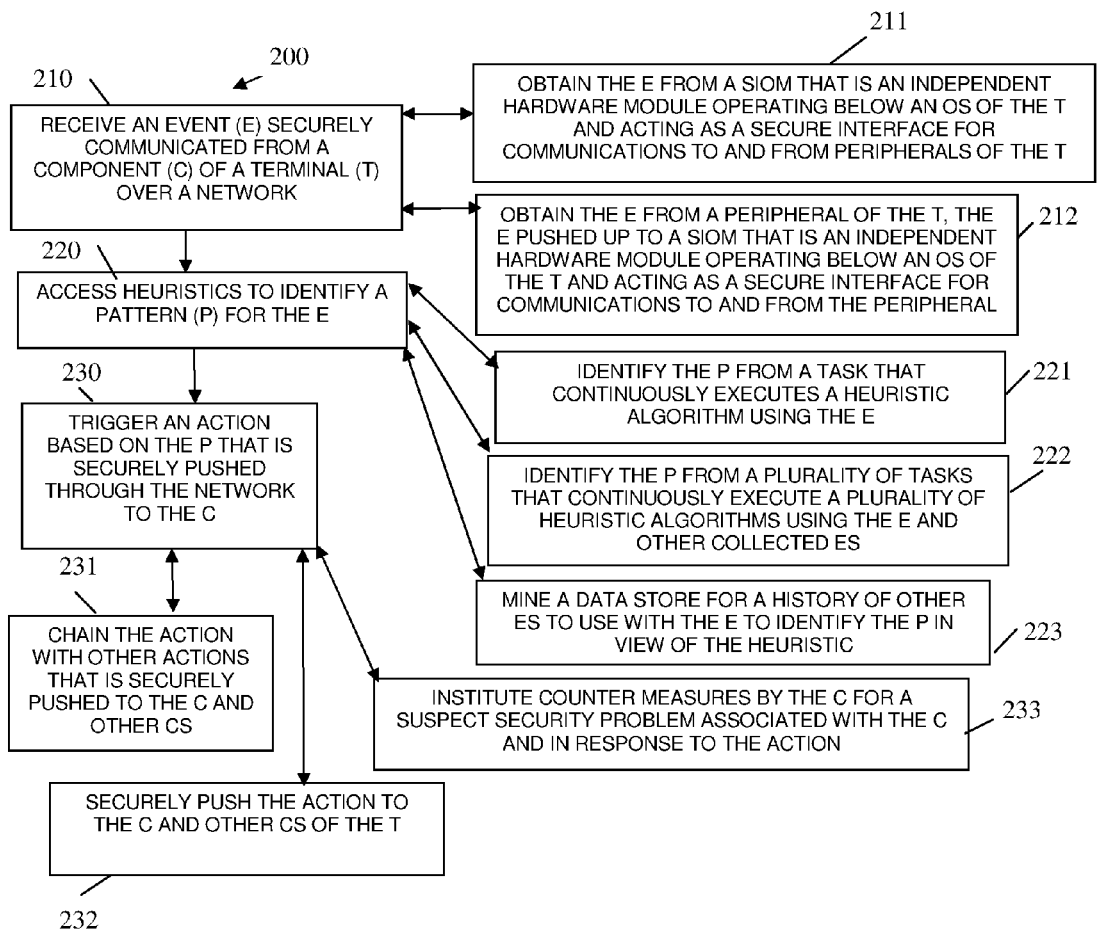
FIG. 2 is a diagram of a method for providing automated intrusion detection and remediation, according to an example embodiment.

FIG. 2 is a diagram of a method 200 for providing automated intrusion detection and remediation, according to an example embodiment. The method 200 (hereinafter "intrusion detection service") is implemented as instructions programmed and residing in memory or on a non-transitory computer-readable (processor-readable) storage medium and executed by one or more processors of a server. The processors are specifically configured and programmed to process the intrusion detection service. The intrusion detection service may also operate over one or more networks. The networks are wired, wireless, or a combination of wired and wireless.

In an embodiment, the intrusion detection service is the IDS of the FIGS. 1A and 1B.

At 210, the intrusion detection service receives or obtains an event securely communicated from a component of a terminal over a network.

In an embodiment, the terminal is one of: a POS device, a kiosk, an ATM, and a Self-Service Terminal (SST).

In an embodiment, the component is one of: a SIOM (described above with reference to the FIGS. 1A and 1B) and a peripheral device.

In an embodiment, the peripheral device is one of: a MSR, a value-media dispenser, a pin pad, an encrypted pin pad, a printer, a scanner, a keyboard, a display, and a touch screen display.

The event is securely communicated using a secure session to carry the data payload of the event over the network connection.

According to an embodiment, at 211, the intrusion detection service obtains the event from a SIOM that is an independent hardware module operating below and outside an operating system (OS) of the terminal and acting as a secure interface for communications to and from peripherals of the terminal.

In an embodiment, at 212, the intrusion detection service obtains the event from a peripheral device of the terminal, the event pushed up to a SIOM during a secure session between the peripheral device and the SIOM. The SIOM is an independent hardware module operating below and outside an OS of the terminal and acting as a secure interface for communications to and from the peripheral of the terminal.

At 220, the intrusion detection service accesses heuristics to identify a pattern for the event. This was discussed above with reference to the IDS of the FIG. 1B.

According to an embodiment, at 221, the intrusion detection service identifies the pattern from a task that continuously executes a heuristic algorithm using the E. That is, as the intrusion detection service executes the task is continuously ruing the heuristic algorithm such that as soon as the event is received it can be matched to the pattern.

In an embodiment, at 222, the intrusion detection service identifies the pattern from a plurality of tasks that continuously execute a plurality of heuristic algorithms using the event and other collected events. So, tasks that execute the heuristic algorithms run continuously and in parallel evaluating the event together with over collected or mined previous events for purposes of matching the pattern in real time as quickly as possible.

In an embodiment, at 223, the intrusion detection service mines a data store for a history of other events to use in connection with the received event to identify or match the pattern in view of the heuristic.

At 230, the intrusion detection service triggers an action based on the pattern and the action is securely and dynamically pushed through the network to the component. This action may be an indication of a potential security threat or issue; alternatively this action may be an indication that the component needs to gather more events and cause those to be sent securely through the network back to the intrusion detection service.

According to an embodiment, at 231, the intrusion detection service chains the action with other actions that is securely pushed to the component and/or other components of the terminal. That is, in some instances a security risk may be associated with multiple components of the terminal and not necessarily just the component associated with originating the event received by the intrusion detection service, such that multiple chained actions are sent securely over the network. It may also be the case that the component only is to perform multiple actions based on the pattern identified.

In an embodiment, at 232, the intrusion detection service securely pushes the action to the component and to other components of the terminal. Here, a single action may be applicable to multiple components of the terminal.

In an embodiment, at 233, the intrusion detection service by sending the action causes the component to institute its own known counter measures for a suspected security problem associated with the component; this is done in response to the component receiving the action or a notification of the action.

It is noted that although the intrusion detection service is described as dynamically managing and adapting in real time to security threats of components of a single terminal that the intrusion detection service can perform this processing on behalf of multiple terminals and each of their components, as was discussed above with reference to the FIGS. 1A and 1B.

Figure 3:
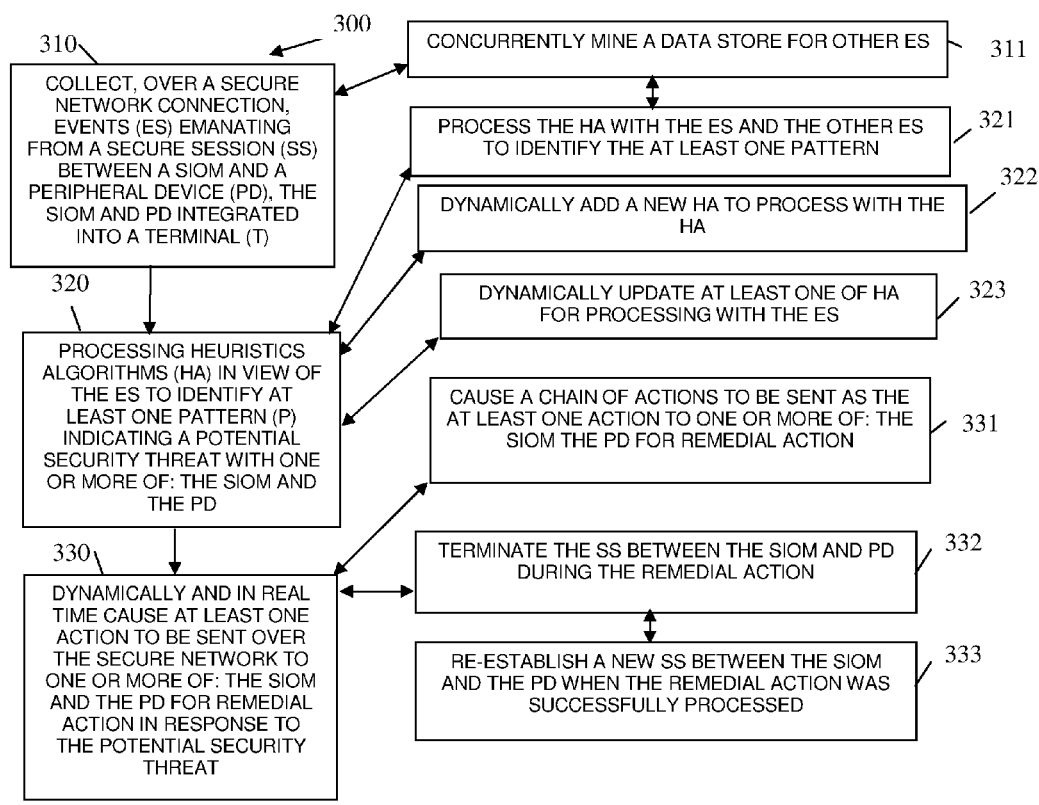
FIG. 3 is a diagram of another method for automated intrusion detection and remediation, according to an example embodiment.

FIG. 3 is a diagram of another method 300 for automated intrusion detection and remediation, according to an example embodiment. The method 300 (hereinafter "dynamic security service") is implemented as instructions and programmed within memory or a non-transitory computer-readable (processor-readable) storage medium that executes on one or more processors of a device; the processors of the device are specifically configured to execute the dynamic security service. The dynamic security service is also operational over one or more networks; the networks may be wired, wireless, or a combination of wired and wireless.

The dynamic security service presents another and in some ways enhanced perspective of the method 200.

In an embodiment, the dynamic security service is the IDS of the FIGS. 1 and 2.

At 310, the dynamic security service collects, over a secure network connection, events emanating from a secure session between a SIOM and a peripheral device. The SIOM and the peripheral device are integrated into a terminal device.

According to an embodiment, at 311, the dynamic security service concurrently mines a data store for other events collected for an enterprise ecosystem that may include multiple terminals from multiple facilities and each terminal have a SIOM and one or more peripherals.

At 320, the dynamic security service processes heuristics algorithms in view of the events for purposes of identifying or matching at least one pattern representing a potential security threat with one or more of: the SIOM and the peripheral device.

In an embodiment of 311 and 320, at 321, the dynamic security service processes the heuristics algorithms with the events and the other events to identity and match to the at least one pattern.

According to an embodiment, at 322, the dynamic security service dynamically adds a new heuristics algorithm to process with the existing heuristics algorithms. This can be done in real time.

In an embodiment, at 323, the dynamic security service dynamically updates and changes at least one heuristics algorithm for processing with the events. This update can also be done in real time.

At 330, the dynamic security service dynamically and in real time causes at least one action to be sent over the secure network to one or more of: the SIOM and the peripheral device for remedial action in response to the potential security threat.

According to an embodiment, at 331, the dynamic security service causes a chain of actions to be sent over the secure network to one or more of: the SIOM and the peripheral device for remedial action based on the identified pattern and its association with the secure threat.

In an embodiment, at 332, the dynamic security service terminates the secure session between the SIOM and the peripheral device during the remedial action.

In an embodiment of 332 and at 333, the dynamic security service re-establishes a new SS between the SIOM and the peripheral device when the remedial action was successfully processed.

Figure 4:
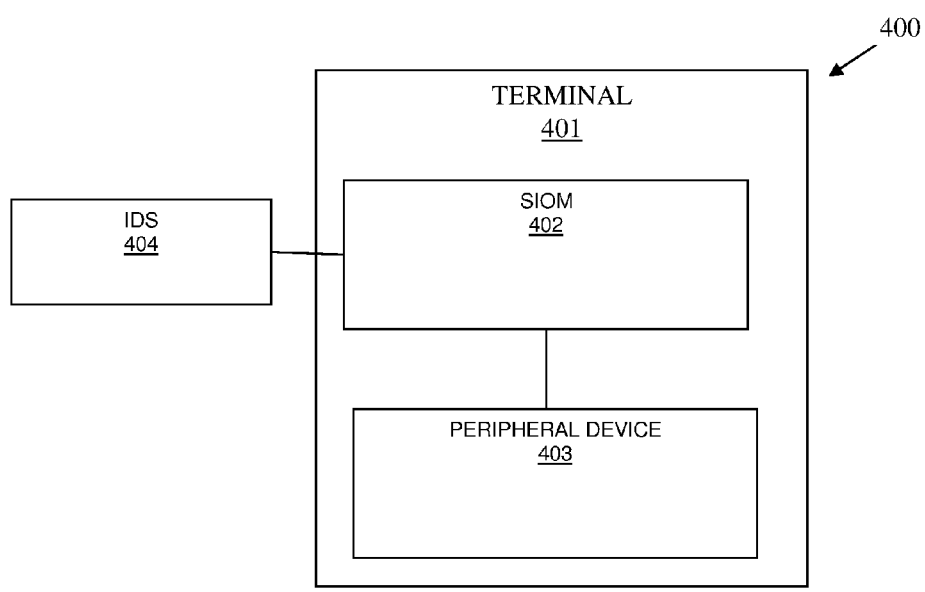
FIG. 4 is a diagram of an IDS system, according to an example embodiment.

FIG. 4 is a diagram of an IDS system 400, according to an example embodiment. Some components of the IDS system 400 are implemented as executable instructions and programmed within a non-transitory computer-readable (processor-readable) storage medium that execute on one or more processors of a network device; the processors are specifically configured to execute the components of the IDS system 400. The IDS system 400 is also operational over one or more networks; any such networks may be wired, wireless, or a combination of wired and wireless.

In an embodiment, the IDS system 400 implements, inter alia, the IDS of the FIGS. 1 and 2.

In an embodiment, the IDS system 400 implements, inter alia, the method 200 of the FIG. 2.

In an embodiment, the IDS system 400 implements, inter alia, the method 300 of the FIG. 3.

The IDS system 400 includes a terminal device 401, a SIOM 402, a peripheral device 403, and an IDS 404.

In an embodiment, the terminal 401 is one of: a POS device, an ATM, a SST, and a kiosk.

The SIOM 402 is integrated into and operates independent of the hardware and OS of the terminal 401. The SIOM 402 acts as a secure interface to the peripheral device 403 and communicates with the peripheral device 403 through secure encrypted sessions within the terminal 401.

The peripheral device 403 is integrated within and into the terminal 401 and receives communicates and sends communications through secure sessions with the SIOM 402.

In an embodiment, the peripheral device 403 is one of: a MSR, a pin pad, an encrypted pin pad, a printer, a scanner, a keyboard, a value media dispenser, a display, and a touch screen display.

The IDS 404 is adapted and configured to: execute on a server that is external to the terminal 401, collect events emanating from a secure session between the SIOM 402 and the peripheral device 403, identify a pattern for a potential security threat based on the collected events, and cause one or more remedial actions to be processed by one or more of: the SIOM 402 and the peripheral device 403 in response to the potential security threat.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;
accessing, by the hardware server, heuristics and identifying a pattern for the security intrusion event relevant to a security intrusion within the peripheral; and
triggering, by the hardware server, an action based on the pattern and securely pushing the action to the peripheral for dynamic and real-time processing by the peripheral in response to the security intrusion, wherein the peripheral comprises a card reader;
wherein the pattern comprises a failure of the secure session between the terminal and the card reader.

2. The method of claim 1, wherein the pattern is configurable.

3. The method of claim 1, wherein the pattern comprises detection of a duplicate secure peripheral identifier.

4. The method of claim 1, wherein the pattern comprises detection of a secure peripheral identifier that is not in an inventory of peripherals on the SIOM.

5. The method of claim 1, wherein the pattern comprises detection of duplicate SIOM identifiers.

6. The method of claim 1, wherein the pattern comprises detection of a revoked or decommissioned peripheral or the SIOM.

7. A method, comprising:
receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;
accessing, by the hardware server, heuristics and identifying a pattern for the security intrusion event relevant to a security intrusion within the peripheral; and
triggering, by the hardware server, an action based on the pattern and securely pushing the action to the peripheral for dynamic and real-time processing by the peripheral in response to the security intrusion;
wherein the pattern comprises receipt of an out-of-order secure session message from the peripheral by the SIOM.

8. A method, comprising:
receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;

accessing, by the hardware server, heuristics and identifying a pattern for the security intrusion event relevant to a security intrusion within the peripheral; and triggering, by the hardware server, an action based on the pattern and securely pushing the action to the peripheral for dynamic and real-time processing by the peripheral in response to the security intrusion;

wherein the pattern comprises receipt of an out-of-order secure session message from the SIOM by the peripheral.

9. A method, comprising:

receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;

accessing, by the hardware server, heuristics and identifying a pattern for the security intrusion event relevant to a security intrusion within the peripheral; and triggering, by the hardware server, an action based on the pattern and securely pushing the action to the peripheral for dynamic and real-time processing by the peripheral in response to the security intrusion;

wherein the pattern comprises a failure to pair with the peripheral by the SIOM.

10. A method, comprising:

receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;

accessing, by the hardware server, heuristics and identifying a pattern for the security intrusion event relevant to a security intrusion within the peripheral; and triggering, by the hardware server, an action based on the pattern and securely pushing the action to the peripheral for dynamic and real-time processing by the peripheral in response to the security intrusion;

wherein the pattern comprises receipt of the secure session message for the secure session that is no longer active by the SIOM.

11. A method, comprising:

receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;

accessing, by the hardware server, heuristics and identifying a pattern for the security intrusion event relevant to a security intrusion within the peripheral; and triggering, by the hardware server, an action based on the pattern and securely pushing the action to the peripheral for dynamic and real-time processing by the peripheral in response to the security intrusion;

wherein the pattern comprises a mismatch between a SIOM pairing request issued by a provisioning server and provisioning events on the SIOM.

12. A method, comprising:

receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;

accessing, by the hardware server, heuristics and identifying a pattern for the security intrusion event relevant to a security intrusion within the peripheral; and triggering, by the hardware server, an action based on the pattern and securely pushing the action to the peripheral for dynamic and real-time processing by the peripheral in response to the security intrusion;

wherein the pattern comprises a failure of a SIOM to be provisioned by the hardware server.

13. A method, comprising:

receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;

accessing, by the hardware server, heuristics and identifying a pattern for the security intrusion event relevant to a security intrusion within the peripheral; and triggering, by the hardware server, an action based on the pattern and securely pushing the action to the peripheral for dynamic and real-time processing by the peripheral in response to the security intrusion;

wherein the pattern comprises failure of the peripheral to create the secure session message after the secure session is established.

14. A method, comprising:

receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;

accessing, by the hardware server, heuristics and identifying a pattern for the security intrusion event relevant to a security intrusion within the peripheral; and triggering, by the hardware server, an action based on the pattern and securely pushing the action to the peripheral for dynamic and real-time processing by the peripheral in response to the security intrusion;

wherein the pattern comprises failure of the peripheral to decode and decrypt a message during the secure session.

15. A method, comprising:

receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;

accessing, by the hardware server, heuristics and identifying a pattern for the security intrusion event relevant to a security intrusion within the peripheral; and triggering, by the hardware server, an action based on the pattern and securely pushing the action to the peripheral for dynamic and real-time processing by the peripheral in response to the security intrusion;

wherein the pattern comprises changing a secure profile used for communication during the secure session by the peripheral.

16. A method, comprising:

receiving, by a hardware server, a security intrusion event securely communicated from a peripheral of a terminal over a network, wherein receiving further includes obtaining the security intrusion event from the peripheral of the terminal, the security intrusion event pushed up to a secure input/output module (SIOM) that is acting as a secure interface for communications to and from the peripheral during a secure session between the peripheral and the SIOM, and wherein the SIOM is independent of the operating system;

accessing, by the hardware server, heuristics and identifying a pattern for the security intrusion event relevant to a security intrusion within the peripheral; and triggering, by the hardware server, an action based on the pattern and securely pushing the action to the peripheral for dynamic and real-time processing by the peripheral in response to the security intrusion;

wherein the pattern comprises failure of the SIOM and detection of SIOM attempts to re-pair with the peripheral.

* * * * *